(12) United States Patent
Mahiddini et al.

(10) Patent No.: US 10,893,040 B2
(45) Date of Patent: Jan. 12, 2021

(54) ACCESS CONTROL WITH AUTHENTICATION

(71) Applicant: Alcatel Lucent, Boulogne-Billancourt (FR)

(72) Inventors: Patrice Mahiddini, Nozay (FR); Corinne Sayag, Nozay (FR); Dominique Rondeau, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 219 days.

(21) Appl. No.: 15/129,433

(22) PCT Filed: Apr. 2, 2015

(86) PCT No.: PCT/EP2015/057419
§ 371 (c)(1),
(2) Date: Sep. 27, 2016

(87) PCT Pub. No.: WO2015/165691
PCT Pub. Date: Nov. 5, 2015

(65) Prior Publication Data
US 2017/0126668 A1  May 4, 2017

(30) Foreign Application Priority Data

Apr. 28, 2014 (EP) .................................... 14305625

(51) Int. Cl.
*H04L 29/06* (2006.01)
*H04W 4/80* (2018.01)
(Continued)

(52) U.S. Cl.
CPC .......... *H04L 63/0838* (2013.01); *G06F 21/31* (2013.01); *G06F 21/35* (2013.01);
(Continued)

(58) Field of Classification Search
CPC . H04L 63/08; H04L 63/0838; H04L 63/0876; H04L 63/0892; H04L 63/10; H04L 63/101
See application file for complete search history.

(56) References Cited

U.S. PATENT DOCUMENTS 7,502,993 B1 * 3/2009 Dodrill ................... H04L 67/02
715/205
10,354,246 B1 * 7/2019 Janiga ................ G06Q 20/3223
(Continued)

FOREIGN PATENT DOCUMENTS

CN 101272630 9/2008
EP 1965595 9/2008
(Continued)

OTHER PUBLICATIONS

Li Longhua, A Novel Design of OTP-based Authentication Scheme Using Smart phones and 2-D Barcodes for the Visually Impaired, •Jul. 2012, ACM, pp. 1-4. (Year: 2012).*
(Continued)

*Primary Examiner* — Kari L Schmidt
*Assistant Examiner* — Fahimeh Mohammadi
(74) *Attorney, Agent, or Firm* — McCracken & Gillen LLC

(57) ABSTRACT

A technique is provided for authentication of a user accessing an access control device. The technique includes an application server that receives a request from a communication device associated with the user or the access control device. The request contains an identifier of the communication device, an identifier of the access control device and presence data indicating that the communication device is associated with the access control device. The application server checks a database for the user's subscription, sends a response to the access control device to request the user to enter a secret code via an interface of the access control
(Continued)

device, receives a temporary secret code generated by a service provider server if the entered secret code is correct, and sends a message containing the temporary secret code to the communication device to request the user to enter the secret code via the interface of the access control device.

20 Claims, 2 Drawing Sheets

(51) Int. Cl.
*H04W 12/06* (2009.01)
*G06F 21/31* (2013.01)
*G06F 21/35* (2013.01)
*H04L 29/08* (2006.01)
*H04W 4/14* (2009.01)

(52) U.S. Cl.
CPC ............ *H04L 63/083* (2013.01); *H04L 63/18* (2013.01); *H04L 67/02* (2013.01); *H04W 4/80* (2018.02); *H04W 12/06* (2013.01); *H04L 63/0853* (2013.01); *H04L 67/42* (2013.01); *H04L 2463/082* (2013.01); *H04W 4/14* (2013.01)

(56) References Cited

U.S. PATENT DOCUMENTS

| | | | |
|---|---|---|---|
| 2006/0094403 A1* | 5/2006 | Norefors | H04W 12/0608 455/411 |
| 2007/0294425 A1* | 12/2007 | Sobti | H04M 3/02 709/231 |
| 2008/0207171 A1* | 8/2008 | van Willigenburg | G07C 9/00103 455/411 |
| 2009/0249454 A1* | 10/2009 | Yamamoto | H04L 63/0838 726/5 |
| 2009/0323608 A1* | 12/2009 | Adachi | H04W 48/18 370/329 |
| 2011/0047607 A1 | 2/2011 | Chen et al. | |
| 2011/0289513 A1* | 11/2011 | Degirmenci | G06F 9/546 719/313 |
| 2011/0300833 A1 | 12/2011 | Shaw | |
| 2012/0059919 A1* | 3/2012 | Glaser | G06F 11/3664 709/223 |
| 2012/0096131 A1* | 4/2012 | Bhandari | G07C 9/00817 709/220 |
| 2013/0097674 A1* | 4/2013 | Jindal | H04L 63/0876 726/4 |
| 2013/0160097 A1* | 6/2013 | Dowlatkhah | H04L 9/321 726/6 |
| 2013/0165081 A1* | 6/2013 | Wuthnow | H04N 21/41407 455/411 |
| 2013/0205305 A1* | 8/2013 | Lv | H04W 4/00 719/313 |
| 2013/0262303 A1* | 10/2013 | Metral | G07F 19/20 705/43 |
| 2014/0094167 A1* | 4/2014 | Thota | H04W 48/20 455/434 |
| 2014/0143137 A1* | 5/2014 | Carlson | G06Q 20/18 705/39 |
| 2014/0206348 A1* | 7/2014 | Johnsson | H04W 48/06 455/434 |
| 2015/0302411 A1* | 10/2015 | Bondesen | G06Q 20/20 705/72 |

FOREIGN PATENT DOCUMENTS

| | | |
|---|---|---|
| GB | 2379040 | 2/2003 |
| JP | 2001117804 | 4/2001 |
| JP | 2004272827 | 9/2004 |
| JP | 2008219689 | 9/2008 |
| JP | 2010530647 | 9/2010 |
| WO | 96/00485 | 1/1996 |
| WO | 2013/030832 | 8/2012 |

OTHER PUBLICATIONS

Liang Fang et al., Secure Password-Based Authenticated Key Exchange for Web Services, Oct. 2004, ACM, pp. 9-15. (Year: 2004).*

Jalal Al-Muhtadi et al., A Flexible, Privacy-Preserving Authentication Framework for Ubiquitous Computing Environments, Jul. 2-5, 2002, IEEE, pp. 1-6. (Year: 2002).*

Do van Thanh et al., Strong authentication with mobile phone as security token, Oct. 12-15, 2009, IEEE, pp. 777-782. (Year: 2009).*

Office Action in related Chinese Application No. 2015800229475, dated May 5, 2019, 5 pages including English translation.

* cited by examiner

ACCESS CONTROL WITH AUTHENTICATION

FIELD OF THE INVENTION

The present invention pertains to the authentication of user for access to a service.

BACKGROUND

Usually, the accesses to a large number of systems or sites are protected via personal smartcards or badges.

There is a need to replace or complement these solutions with an additional level of security.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for an authentication of user accessing an access control device providing a service via a communication device associated with a user, comprising the following steps in an application server:

receiving a request from one of the communication device and the access control device, the request containing an identifier of the communication device, an identifier of the access control device and presence data indicating that the communication device is associated with the access control device via a communication session, checking in a database a user subscription by means of the identifier of the communication device and the identifier of the access control device, sending a response to the access control device to request the user to enter a secret code via an interface of the access control device, if the entered secret code is correct, receiving a temporary secret code generated by a service provider server, sending a message to the communication device, the message containing the temporary secret code, to request the user to enter the secret code via the interface of the access control device.

Advantageously, the invention provides a solution to allow anybody to access his/her company, network or bank systems only with any communication device. For example, a bank user can get cash money from an ATM (Automated Teller Machine) without a credit card.

In an embodiment, the message is a short message.

In an embodiment, the message is a voice message generated by a network server requested by the application server, the voice message being provided to the communication device via an audio call.

In an embodiment, the access control device interrogates a service provider server to check if the entered secret code is correct.

In an embodiment, if the entered secret code is correct, the service provider server generates the temporary secret code, and sends the generated temporary secret code to the application server and to the access control device.

In an embodiment, the service entity is one of an Automated Teller Machine, an apparatus controlling access to a restricted area, a badge controller, a motorized vehicle with a wireless starter.

In an embodiment, the secret code is a PIN code.

In an embodiment, the application server receives another request from the communication device after that the communication device is disconnected from the access control device, the request containing the identifier of the communication device, the identifier of the access control device and presence data indicating that the communication device is not associated anymore with the service entity via a communication session.

In an embodiment, the communication device is associated with the access control device via a protocol among Digital Living Network Alliance protocol, Bluetooth protocol, Near Field Communication protocol, and Radio-Frequency Identification protocol.

In an embodiment, the secret code is received by a dedicated web service of the application server.

In an embodiment, the secret code is received by a dedicated web service of an Application Programming Interface gateway connected to the application server.

The invention also pertains to a server for an application server for an authentication of user accessing an access control device providing a service via a communication device associated with a user, comprising:

means for receiving a request from one of the communication device and the access control device, the request containing an identifier of the communication device, an identifier of the access control device and presence data indicating that the communication device is associated with the access control device via a communication session, means for checking in a database a user subscription by means of the identifier of the communication device and the identifier of the access control device, means for sending a response to the access control device to request the user to enter a secret code via an interface of the access control device, means for receiving a temporary secret code generated by a service provider server, if the entered secret code is correct, means for sending a message to the communication device, the message containing the temporary secret code, to request the user to enter the secret code via the interface of the access control device.

The invention also pertains to computer program capable of being implemented within a server, said program comprising instructions which, when the program is executed within said server, carry out steps according to the method according to the invention.

BRIEF DESCRIPTION OF THE FIGURES

Some embodiments of the present invention are now described, by way of example only, and with reference to the accompanying drawings. The same reference number represents the same element or the same type of element on all drawings.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
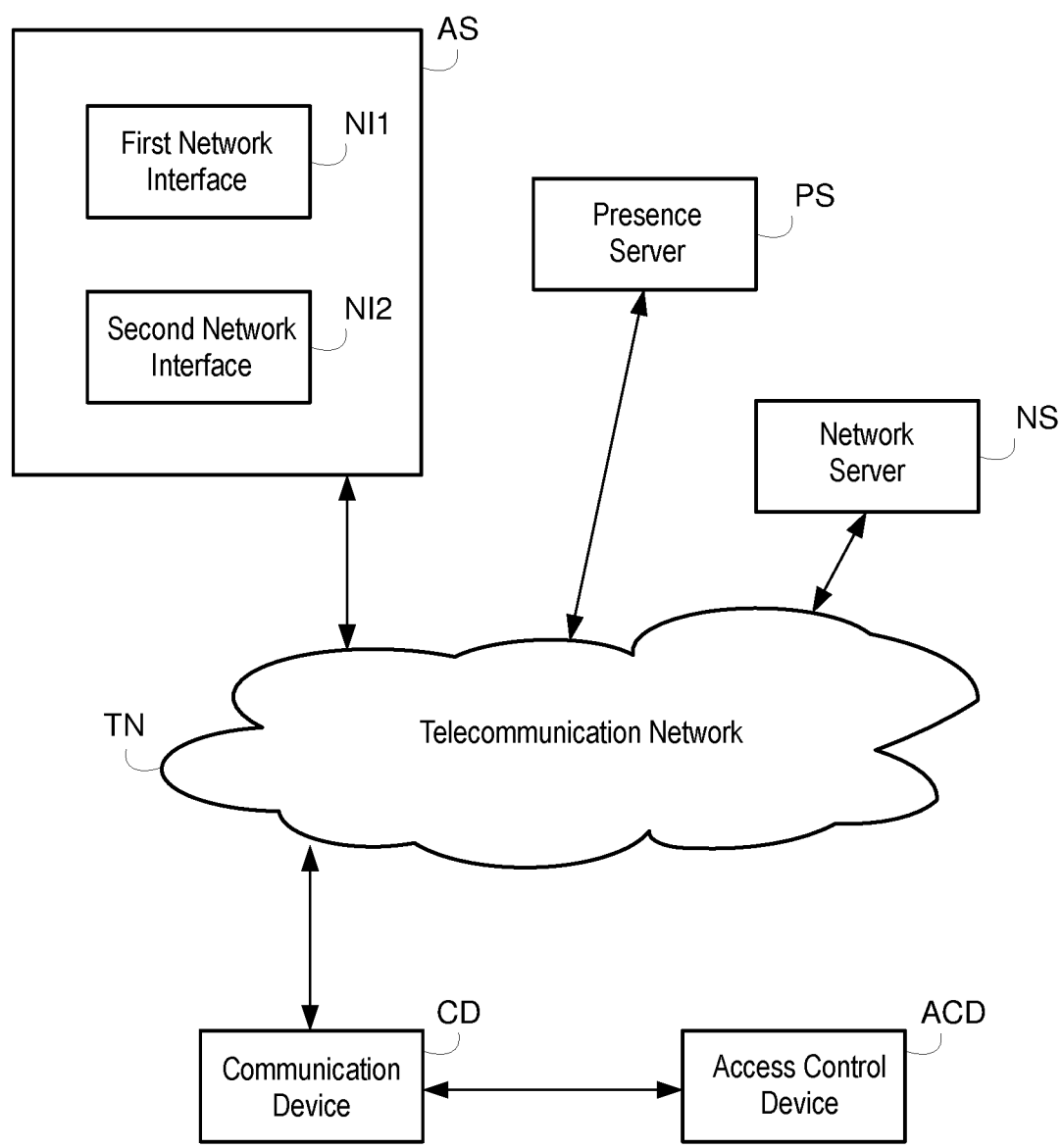
FIG. 1 is a schematic block diagram of a communication system according to one embodiment of the invention for an access control with authentication.

Referring to FIG. 1, a communication system comprises an application server AS, a service provider server SPS, a presence server PS, a network server NS and a communication device CD which are able to communicate between them through at least a telecommunication network TN, and an access control device ACD able to communicate with the communication device CD through a wireless network or a wired connection.

For example, the telecommunication network TN is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio.

The telecommunication network TN can be associated with a packet network, for example, an IP ("Internet Protocol") high-speed network such as the Internet or an intranet, or even a company-specific private network.

According to one embodiment of the invention that will be referred to throughout the remainder of the description, the telecommunication network TN comprises a packet network, for example, an IP ("Internet Protocol") high-speed network such as the Internet or an intranet, or even a company-specific private network. The packet network is connected to an IP Multimedia Subsystem (IMS) network.

The control of a communication related to the communication device is performed within the IMS network, particularly by three Call State Control Function (CSCF) control entities: the entities Proxy CSCF (P-CSCF), Interrogating CSCF (I-CSCF), and Serving-CSCF (S-CSCF).

The entity P-CSCF is the first point of contact in the IMS network, and its address is discovered by the user terminal when a Packet Data Protocol (PDP) context is activated to exchange SIP messages.

The network server NS is included in the IMS network and manages at least some of the call state control functions, in particular the P-CSCF function.

In one embodiment, the network server NS implements a Converged Telephony Server (CTS) that is a IMS compliant telephony application server that provides consumer, business and converged services to SIP(Session Initiation Protocol), IP and legacy fixed and wireless subscribers.

In one embodiment, the network server NS implements a Media Resource Function (MRF) that provides media related functions such as media manipulation (e.g. voice stream mixing) and playing of tones and announcements.

In one embodiment, the network server NS implements a Text To Speech application that converts normal language text into speech.

In one variant, the Converged Telephony Server (CTS), the Media Resource Function (MRF) and Text To Speech application are implemented in different network servers included in the IMS network.

The presence server PS is included in the IMS network and manages a database storing information about connectivity of communication devices, for example pairing information of communication devices.

The presence server PS is part of a Rich Communication Suite (RCS) that uses the capabilities of IMS core system as the underlying service platform taking care of issues such as authentication, authorization, registration, charging and routing.

The application server AS is an API (Application Programming Interface) gateway, and may use open standard applications such as HTTP (Hypertext Transfer Protocol), SOAP (Simple Object Access Protocol) and REST (Representational state transfer).

In another embodiment, the application server AS acts as or may take advantage of an API gateway connected to application server AS to access IMS network services.

An Application Programming Interface (API) is a specification that defines an interface for software components to communicate with each other. An API may include specifications for functions, data structures, object classes, and variables. Some examples of API specifications include the standard template library in C++, the Microsoft Windows API, libraries in C, and the Java API. When an API specifies a function, the API provides information about how the function is called, what parameters are included in calling the function, and the format and type of data returned by the function.

For example, the application server AS identifies and deploys code objects to implement web services.

The application server AS comprises a first network interface NI1 and a second network interface NI2.

The first network interface NI1 comprises a first set of application programming interfaces to communicate with applications developed and used by the communication device.

The second network interface NI2 comprises a second set of application programming interfaces to communicate with applications on the side of the IMS network, especially with the presence server PS and the network server NS.

For example, the first network interface NI1 implements web services that are exposed REST web services.

In one embodiment, the first network interface NI1 implements four web services.

A first web service, called "NEARDEVICE" service, updates the user's location information in the database of the presence server PS indicating the presence of the user near an access control device, like an ATM, and checks the user existence and the access control availability.

A second web service, called "NOTNEARDEVICE" service, updates the user's location information in the database of the presence server PS indicating the absence of the user near an access control device, like the ATM.

The user's location information is deduced from a message received from the communication device CD.

A third web service, called "ENTERPIN" service, commands the access control device ACD to request user for a secret PIN code. PIN is for Personal Identification Number which is supposed to be known by the end user and which is not supposed to change.

A fourth web service, called "ENTERCODE" service, commands the access control device ACD to request user for a temporary secret code.

The communication device CD can be a personal computer or a laptop, an electronic tablet, a smart phone, a personal digital assistant, for instance. More generally it concerns any type of electronic equipment comprising a communication module, capable of establishing connection with the telecommunication network to exchange data such as messages with other communication equipments.

The access control device ACD can be an apparatus controlling access to a service.

For example, the access control device ACD is an ATM or an apparatus controlling access to a restricted area.

The access control device ACD is linked to the service provider server AS that offers a service via the access control device ACD.

For example, the service provider server AS is a bank server communicating with different ATM for delivering services via interfaces of the ATMs.

In another example, the access control device ACD is a badge controller and the service provider server AS is a server managing different badge controllers.

In another example, the access control device ACD is a motorized vehicle with a wireless starter and the service provider server AS is a server granting access to the vehicle.

In an embodiment, the communication device CD and the access control device ACD can be connected under a communication session established via at least one of the communication protocols among Digital Living Network Alliance protocol and Bluetooth protocol.

In another embodiment, the communication device CD and the access control device ACD can be connected under a communication session established via a cable, such as a USB cable or Ethernet cable.

The communication device CD can implement an application that detects that the communication device is paired with the service entity, via Bluetooth for example, or that the communication device is close to the access control device ACD.

The application can detect that the communication device is close to the access control device ACD by means of a wireless communication protocol, like Bluetooth, NFC (Near Field Communication) or RFiD (Radio-Frequency iDentification), or any wired or wireless communication technology, or by means of wired communication protocol, like USB or Ethernet protocol.

Figure 2:
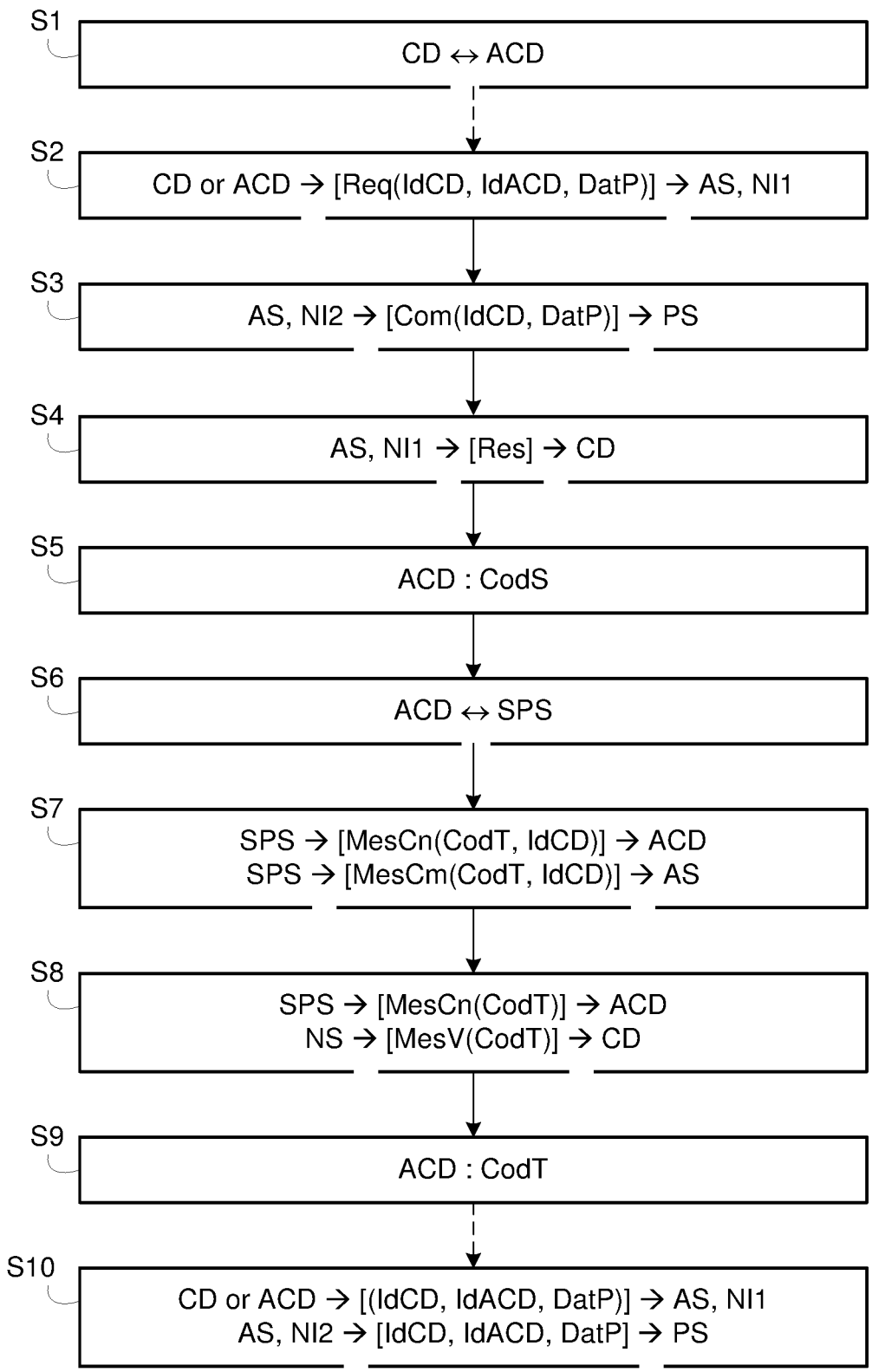
FIG. 2 is a flow chart illustrating a method for an access control with authentication according to one embodiment of the invention.

With reference to FIG. 2, a method for an access control with authentication according to one embodiment of the invention comprises steps S1 to S10 executed within the communication system.

In step S1, the user owning the communication device CD is located close to the access control device ACD and wishes to access the service provided by the access control device ACD.

An application implemented in the communication device CD or in the access control device ACD detects that the communication device is connected to the access control device ACD by means of a wireless communication protocol, like Bluetooth, NFC or RFiD, or any wired or wireless communication technology, or by means of wired communication protocol, like USB or Ethernet protocol.

In step S2, the application in the communication device CD or in the access control device ACD sends a request Req to the first network interface NI1 of the application server AS.

The request Req is for example a HTTP request, and is sent towards a dedicated web service of the first network interface NI1, called "NEARDEVICE" service for example.

The request Req contains an identifier IdCD of the communication device CD, an identifier IdACD of the access control device ACD and presence data DatP containing information about the pairing of the communication device CD with the access control device ACD. In other words, the presence data DatP indicate that the communication device CD is associated with the access control device ACD via a communication session.

In step S3, the application server AS interrogates the presence server PS via the second interface NI2 to check the user existence in the database, i.e. if user has subscribed to the service delivered by the application server, and to check the availability of the service provided by the access control device ACD and the service provider server SPS.

To this end, the application server AS can send a command Com containing the identifier IdCD of the communication device CD and the identifier IdACD of the access control device ACD to the presence server PS that checks if these identifiers are stored in the database.

For example, the identifier IdCD of the communication device CD is a call number or a MSISDN (Mobile Subscriber Integrated Services Digital Network-Number) of the communication device CD.

For example, the identifier IdACD of the access control device CD is a serial number.

In step S4, the application server AS sends a response Res to the access control device CD, via a dedicated web service of the first network interface NI1, called "ENTERPIN" service for example.

The response Res includes a confirmation that the communication device and the access control device are recognized and instructions to command the access control device ACD to request the user to enter a secret code CodS.

In step S5, the access control device ACD requests the user to enter a secret code CodS.

For example, the secret code is a code PIN (Personal Identification Number) that was given to the user when this latter had subscribed to the service delivered by the service provider server SPS. The secret code is associated with the identifier IdCD of the communication device CD.

The secret code was initially stored in the service provider server SPS in correspondence with the identifier IdCD of the communication device CD.

The user enters the secret code CodS, by using an interface of the access control device ACD. For example, the interface is a keypad.

In step S6, the access control device ACD interrogates the service provider server SPS to check if the entered secret code is correct. To this end, the access control device ACD sends a message to the service provider server SPS, the message containing the identifier IdCD of the communication device CD and the entered secret code.

In step S7, if the entered secret code is the same as the secret code stored in the service provider server SPS, the service provider server SPS confirms to the access control device ACD that the entered secret code is correct.

The service provider server SPS generates a temporary secret code CodT.

The service provider server SPS sends a control message MesC to the access control device ACD, the control message MesCn containing the temporary secret code CodT and the identifier IdCD of the communication device CD.

The service provider server SPS sends a command message MesCm to the application server AS, the command message MesCm containing the temporary secret code CodT and the identifier IdCD of the communication device CD.

In step S8, the reception of the command message triggers a dedicated web service of the first network interface NI1, called "ENTERCODE" service for example, that calls the second interface NI2.

The second interface NI2 of the application server AS sends a service message MesS to the network server NS to invoke a Text To Speech function.

The service message MesS includes the temporary secret code CodT.

The Text To Speech function of the network server NS generates a voice message MesV from the temporary secret code CodT.

The network server NS performs then an audio call to the communication device CD, through the Converged Telephony Server (CTS) and the Media Resource Function (MRF) for example and provides the voice message MesV via the audio call.

For example, the voice message is formatted in file of "way" type that can be played by a vocal function of the network server NS.

The user can then listen to the voice message MesV, and thus the temporary secret code CodT, by using the communication device CD.

The use of a voice message is interesting as user keeps no tracks or cache from the temporary secret code in his/her communication device.

In a variant, the application server AS sends a short message to the communication device CD, the short message containing the temporary secret code CodT.

Optionally, the application server AS sends a notification to the access control device ACD, informing that the temporary secret code CodT has been sent to the user.

In step S9, the access control device ACD requests the user to enter a temporary secret code CodT.

The user enters the temporary secret code CodT requested by the access control device ACD, by using the interface of the access control device ACD.

Then the user is granted access to the service delivered by the access control device ACD.

In step S10, the communication device CD disconnects from the access control device ACD, and is unpaired with the access control device ACD.

The application in the communication device CD or in the access control device ACD detects that the communication device CD is not paired anymore with the access control device ACD.

The application sends a request to the first network interface NI1 of the application server AS. The request is sent towards a dedicated web service of the first network interface NI1, called "NOTNEARDEVICE" service for example.

The request contains the identifier IdCD of the communication device CD, the identifier IdACD of the access control device ACD and presence data DatP containing information about the disconnection of the communication device CD with the access control device ACD.

The first network interface NI1 sends a notification to the presence server PS, via the second interface NI2, the notification containing the identifier IdCD of the communication device CD, the identifier IdACD of the access control device ACD and the presence data DatP.

The presence server PS updates then the user's location information in the database by means of the identifier IdCD of the communication device CD and the presence data DatP.

It is set that the user is not close to the access control device ACD anymore.

The invention described here relates to a method and a server for an access control with authentication. According to one implementation of the invention, steps of the invention are determined by the instructions of a computer program incorporated into a server, such as the application server. The program comprises program instructions which, when said program is loaded and executed within the server, carry out the steps of the method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the method according to the invention.

The invention claimed is:

1. A method for an authentication of a user accessing an access control device providing a service via a communication device associated with the user, comprising:

receiving, by an application server via a first interface, a request for a web service from one of the communication device and the access control device operably connected to the application server via a network comprising a presence server that manages a network database and a network server that provides services, the request containing an identifier of the communication device, an identifier of the access control device and pairing data that indicates that the communication device is associated with the access control device via a communication session, checking in the network database, by the application server via a second interface, a user subscription by means of the identifier of the communication device and the identifier of the access control device, sending, by the application server via the first interface, a response to the access control device to request the user to enter a secret code via an interface of the access control device, in a condition that the entered secret code matches a stored secret code at a service provider server, receiving, by the application server via the second interface, a temporary secret code generated by the service provider server, and sending, by the application server via the first interface, a message to the communication device, the message containing the temporary secret code, to request the user to enter the temporary secret code via the interface of the access control device for access to the service provided by the access control device.

2. The method according to claim 1, wherein the message to the communication device is a short message.

3. The method according to claim 1, wherein the message to the communication device is a voice message generated by a network server requested by the application server, the voice message being provided to the communication device via an audio call.

4. The method according to claim 1, wherein the access control device interrogates the service provider server to check if the entered secret code matches the stored secret code.

5. The method according to claim 4, wherein, in the condition that the entered secret code matches the stored secret code, the service provider server generates the temporary secret code and sends the generated temporary secret code to the application server and to the access control device.

6. The method according to claim 1, wherein the access control device is one of an Automated Teller Machine, an apparatus controlling access to a restricted area, a badge controller, or a motorized vehicle with a wireless starter.

7. The method according to claim 1, wherein the secret code is a Personal Identification Number (PIN) code.

8. The method according to claim 1, wherein the application server receives another request from the communication device and after that the communication device is disconnected from the access control device, the request containing the identifier of the communication device, the identifier of the access control device and unpairing data that indicates that the communication device is no longer associated with the access control device via the communication session.

9. The method according to claim 1, wherein the communication device is associated with the access control device via a protocol among Digital Living Network Alliance protocol, Bluetooth protocol, Near Field Communication protocol, and Radio-Frequency Identification protocol or by means of a wired communication protocol.

10. The method according to claim 1, wherein the temporary secret code is received by a dedicated web service of the application server.

11. The method according to claim 1, wherein the temporary secret code is received by a dedicated web service of an Application Programming Interface gateway connected to the application server.

12. The method according to claim 1, wherein the network comprises an Internet Protocol network.

13. The method according to claim 1, wherein the one of the communication device and the access control device operably connect to an interface of the application server that implements web services.

14. The method according to claim 1, wherein the secret code is associated with the identifier of the communication device.

15. The method according to claim 1, wherein the application server provides applications that include Hypertext Transfer Protocol, Simple Object Access Protocol and Representational state transfer.

16. The method according to claim 1, wherein the identifier of the access control device is a serial number.

17. The method according to claim 1, wherein the identifier of the communication device is a call number or a Mobile Subscriber Integrated Services Digital Network number of the communication device.

18. The method according to claim 1, further comprising updating, by the application server via the second interface, the network database when the communication device is unpaired with the access control device.

19. A network for an authentication of a user accessing an access control device providing a service via a communication device associated with the user, the network comprising:
a presence server computer configured to manage a network database storing information about connectivity of communication devices;
a network server configured to provide services that include a text to speech function, voice stream mixing and playing of tones and announcements; and
an application server connected to the presence server computer and the network server via the network, wherein the application server comprises:
a first network interface configured to
receive a request for a web service from one of the communication device and the access control device operably connected to the application server via the network, the request containing an identifier of the communication device, an identifier of the access control device and pairing data that indicates that the communication device is associated with the access control device via a communication session,
send a response to the access control device to request the user to enter a secret code via an interface of the access control device, and
a second network interface configured to
check in the network database a user subscription by means of the identifier of the communication device and the identifier of the access control device,
in a condition that the entered secret code matches a stored secret code at a service provider server, receive a temporary secret code generated by the service provider server,
wherein the first network interface is further configured to send a message to the communication device, the message containing the temporary secret code to request the user to enter the temporary secret code via the interface of the access control device for access to the service provided by the access control device.

20. A non-transitory information medium capable of being implemented within an application server for an authentication of a user accessing an access control device providing a service via a communication device associated with the user, said information medium comprising executable instructions for performing steps, comprising:
receiving, by the application server via a first interface, a request for a web service from one of the communication device and the access control device operably connected to the application server via a network comprising a presence server that manages a network database and a network server that provides services, the request containing an identifier of the communication device, an identifier of the access control device and pairing data that indicates that the communication device is associated with the access control device via a communication session,
checking in the network database, by the application server via a second interface, a user subscription by means of the identifier of the communication device and the identifier of the access control device,
sending, by the application server via the first interface, a response to the access control device to request the user to enter a secret code via an interface of the access control device,
in a condition that the entered secret code matches a stored secret code at a service provider server, receiving, by the application server via the second interface, a temporary secret code generated by the service provider server, and sending, by the application server via the first interface, a message to the communication device, the message containing the temporary secret code to request the user to enter the temporary secret code via the interface of the access control device for access to the service provided by the access control device.

* * * * *